Aug. 10, 1937.   C. H. CHACE ET AL   2,089,783
MEANS FOR DRYING FOOTWEAR
Filed March 12, 1936   3 Sheets-Sheet 3

Charles H. Chace
Alfred B. Lingley
James P. Marshall
Inventors by Harry Dexter Peck
Attorney.

Patented Aug. 10, 1937

2,089,783

UNITED STATES PATENT OFFICE 2,089,783

MEANS FOR DRYING FOOTWEAR

Charles H. Chace, Warwick, Alfred B. Lingley, Cranston, and James P. Marshall, Coventry, R. I., assignors to Phillips-Baker Rubber Company, Providence, R. I., a corporation of Rhode Island Application March 12, 1936, Serial No. 68,360

3 Claims. (Cl. 34—32)

This invention relates to improved method and means for drying footwear.

During the manufacture of footwear it is usually necessary to employ some form of adhesive in a liquid or semi-liquid condition which must be sufficiently dried before it can be used to bind two elements together. The present invention is directed to improving the drying of such an adhesive to the end that considerable time will be saved and a better quality of product obtained. The invention is herein particularly described in its application to the manufacture of rubber footwear, such as tennis shoes or the like, but its scope is not necessarily limited to this particular product. Moreover, in the description which follows, the adhesive is referred to as cement, but this term is not to be taken in any limiting sense but as broadly indicating any adhesive which must be dried to the "tacky" state for proper adhesion.

Various methods have been employed in applying liquid adhesive. In the manufacture of tennis shoes, for example, the most common method followed at present is that of brushing, the operative holding a shoe in one hand and applying cement by a brush to the bottom, around the lower edge or zone of the upper, and across the toe where the toe cap is eventually to be attached. This brushing method has the advantage that less time is required to dry the cement to the proper "tacky" condition most suitable for application of the foxings, trim, and elements of the sole. This particular advantage is gained, however, with other disadvantages. In brushing on the cement a rather light or thin layer is applied, and this is not entirely desirable although because of it the time for drying is necessarily shortened. Moreover, however skillful the operatives may become, it is physically impossible by brushing to apply the layer of cement with uniform consistency. At one or more places the cement layer will be thicker than at others. This is objectionable because the drying of the cement proceeds with marked irregularity, the thinner portions drying more rapidly than the thicker portions and not infrequently becoming overdried, as it were, by the time the thicker portions are in proper condition to receive other elements. What is true of the cement on one shoe is obviously true with respect to different shoes, particularly where several operatives are engaged in the brushing operation. All of which establishes that whatever time is saved during drying, following the brushing method, is largely offset by the loss in uniformity of the cement layer and the irregularities in the seasoning of the cement due to unequal drying thereof.

The other most common method of applying cement, and the one to be preferred from the standpoint of quality, is the so-called dipping method. The cement is maintained at a constant level in an open pan or container. The toe of the shoe may be first inserted in the cement to coat the area of the upper to which the toe cap is later attached. Then the shoe is placed bottom down in this cement until it touches the bottom of the pan or some gauge plate provided therein. This insures that the cement will be applied not only to the bottom but to a definite height around the sides of the upper. This dipping method insures a substantially uniform coating of cement on the shoe and it necessarily follows that the drying proceeds with marked regularity not only throughout the cement on one shoe but on all shoes. The only objection to this method is the time required for drying the cement. The layer of cement obtained by dipping is much thicker than is a layer applied by a brush,—another advantage of the dipping method—and necessarily takes longer to dry or season properly. Various conveyors of quite extended travel throughout the room of a factory have been proposed whereby the cemented shoes can move slowly along for a considerable period during which the drying slowly proceeds in the normal atmosphere of the room. This not only consumes a large amount of time but the space needed for such extended conveyors is a very considerable item. Moreover, it requires at least two operators for each conveyor, one to dip the shoe and place it on the conveyor and another at some remote point to remove the dried shoe from the conveyor.

It is among the objects of this invention to provide a method and means for the drying of articles coated with adhesive which shall not only embrace the advantages of both the brushing and the dipping methods but shall also avoid the characteristic disadvantages of both. While the dipping method of applying the adhesive is deemed preferable, the brushing method, or some other process of applying the adhesive may be used, and the drying features of the present invention can still be enjoyed. With the dipping method, however, all the advantages of a heavy coat of cement uniformly applied are gained. The invention contemplates the placing of the cemented shoe in a drying chamber through which heated air is forced at any desired velocity. In the chamber is a conveyor so designed that in its travel it returns the dried shoe to the same operator who dipped it and placed it on the conveyor. Thus, by the improved method, the same operator removes a dried shoe from the conveyor and replaces it with one just dipped.

The best mode in which it has been contemplated applying the principles of the present invention is shown in the accompanying drawings but these are merely illustrative and it is intended that the patent shall cover by suitable expression in the appended claims whatever features of patentable novelty exist in the invention disclosed.

Figure 1:
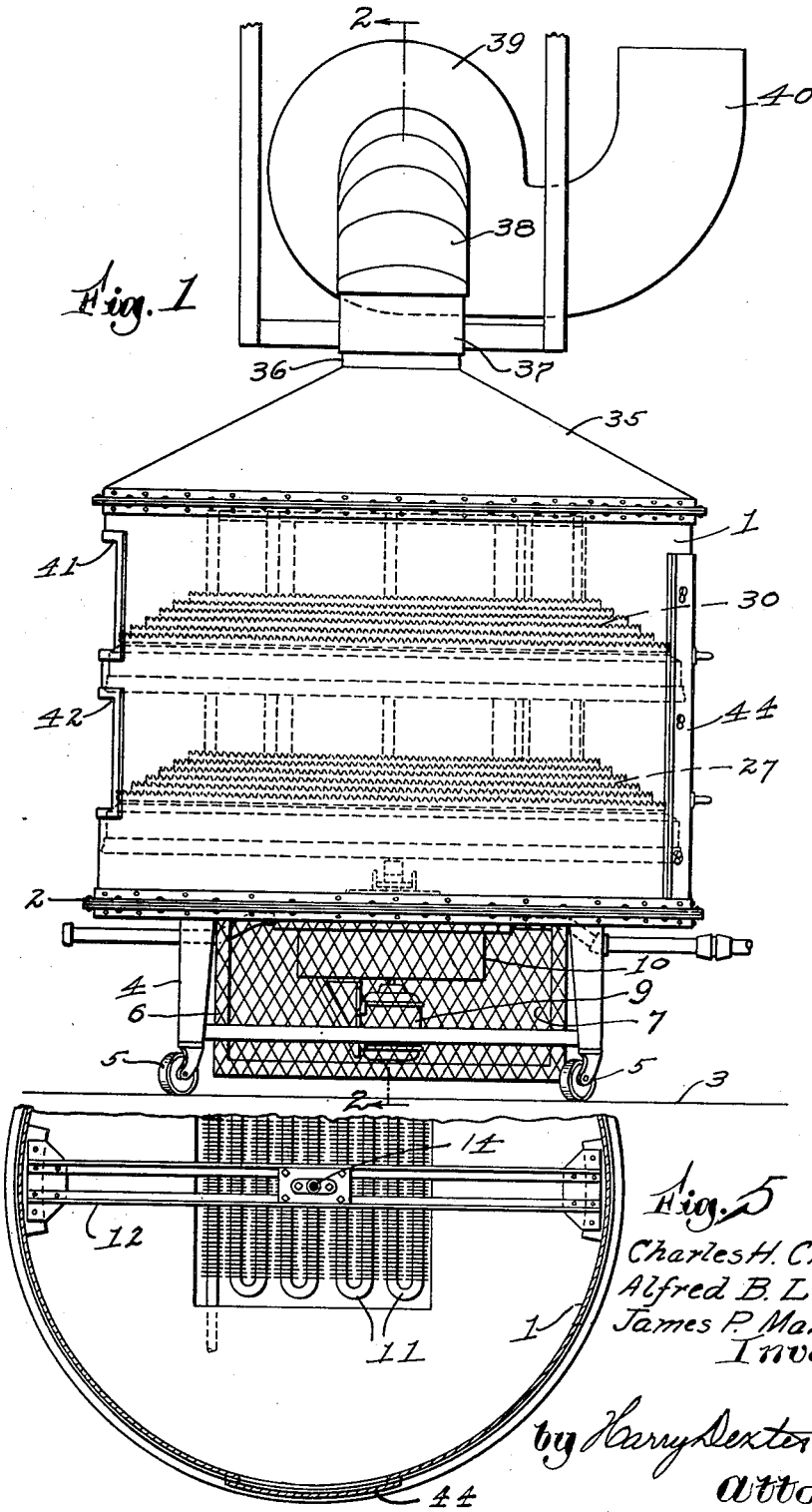
Figure 1 is an elevation of a drier constructed and operated in accordance with the principles of the present invention.
Figure 2:
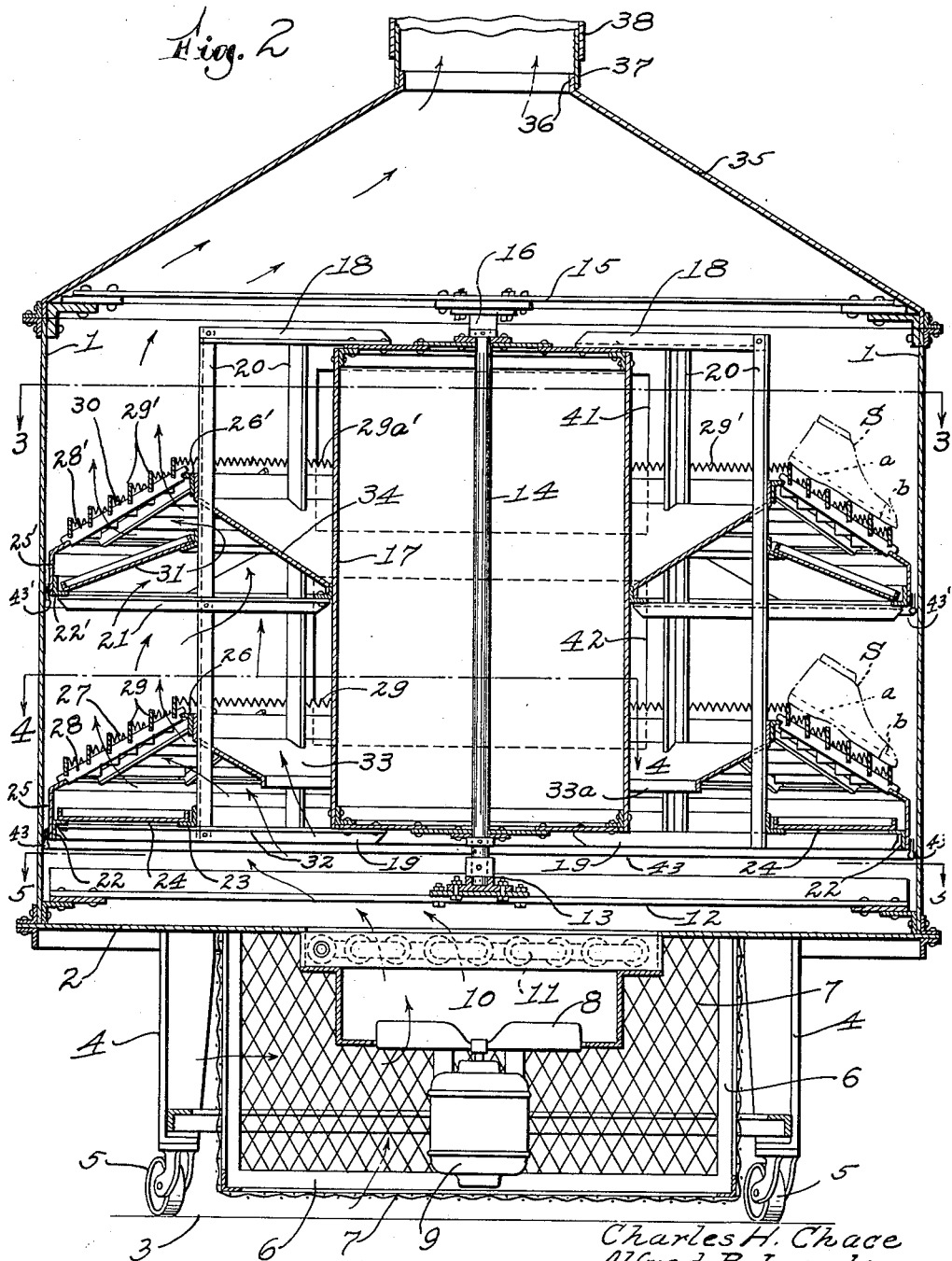
Figure 2 is an elevation in vertical section taken as on line 2—2 of Figure 1.
Figure 3:
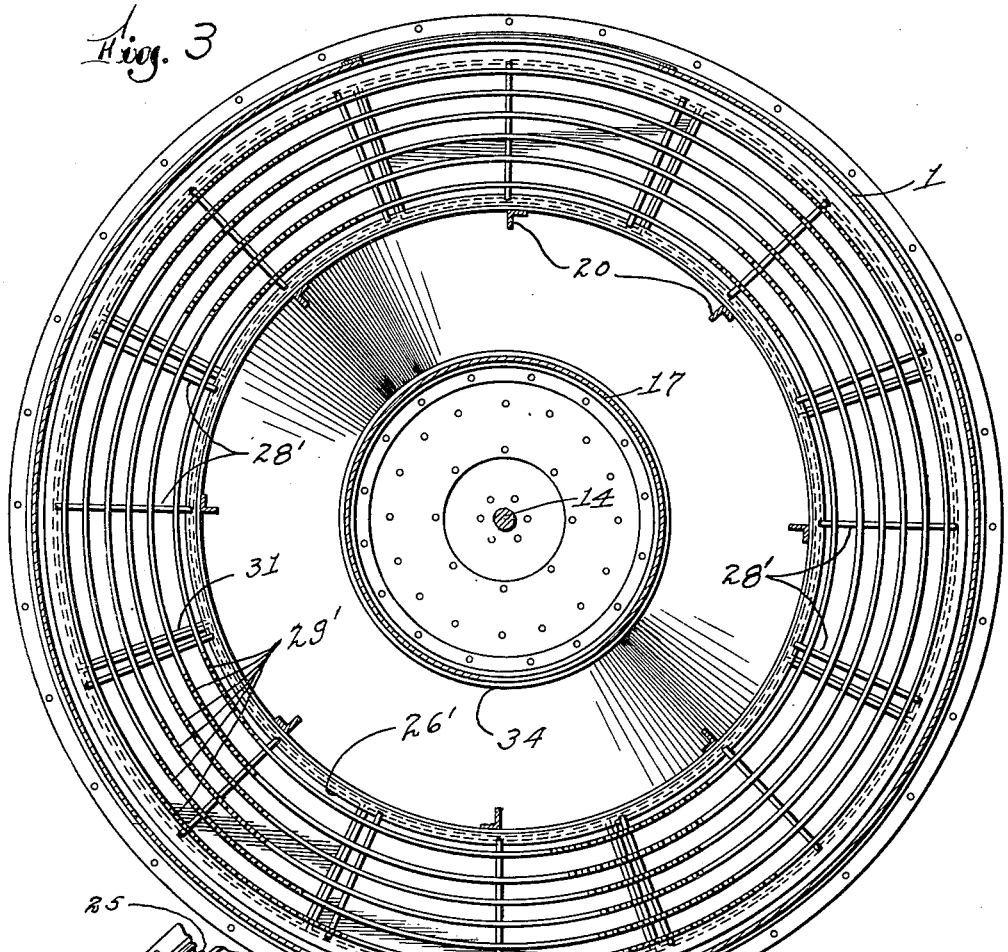
Figure 3 is a plan in section as on line 3—3 of Figure 2.
Figure 4:
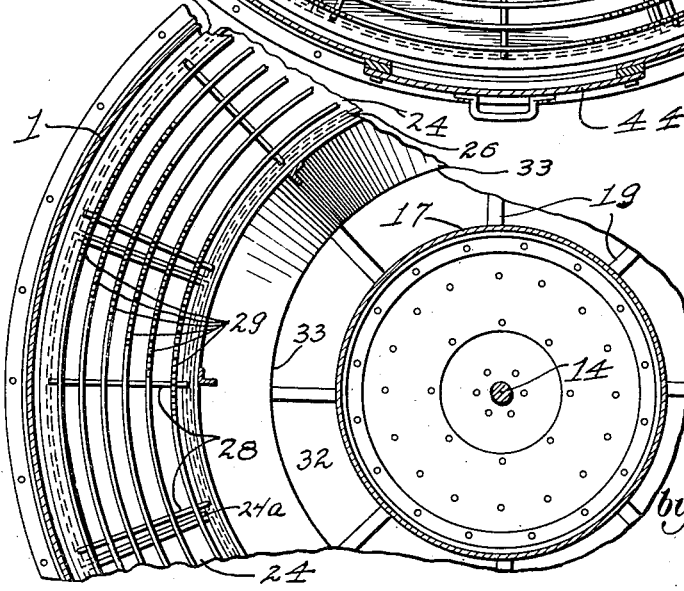

Figures 4 and 5 are plans of portions of the drier, taken in section as on lines 4—4 and 5—5 respectively of Figure 2.

Referring more particularly to the drawings the improved means for practicing the improved method of drying is disclosed as a cylindrical casing 1 having a rotor therein rotatable about the axis thereof. The bottom 2 of the casing is supported at a suitable height above the floor 3 by legs 4 having casters 5, whereby the drier as a whole may be easily moved from one place in a factory to another. This is of advantage where in certain sections of a factory the type of shoe being made is sometimes changed from one requiring the application of an adhesive to one in which no adhesive is used. If no immediate use of the drier is required, it can be set out of the way and even the small space it would occupy can be otherwise used.

Another advantage flowing from the portable feature of the drier is that if one gets out of order temporarily, it can be moved out of its operative position and immediately replaced by another drier in working order. Thus no appreciable time or production is lost even when the inevitable temporary failures of a mechanical device occur. And finally, as will more particularly hereinafter appear, the drier provides for the dripping of excess adhesive from the shoe, and since this dripping is caught and retained in the drier it becomes necessary in the course of time to discontinue the use of the drier while it is being cleaned of its collection of adhesive. Again the portable feature is an advantage since a cleaned drier may be rolled into place as the other is removed for cleaning without interruption of the production.

Under the bottom 2 of the casing is an open framework 6 surrounded by a suitable screen 7. The latter prevents any loose material on the floor, or the skirts of female operatives, from being drawn into the space under the drier where a fan 8 and its driving motor 9 are supported. This fan forces the air through an enclosed chamber 10 under the bottom of the casing, in which chamber may be provided suitable heat exchanging means 11. Those shown are finned tubes adapted to utilize steam as the heating medium but it is obvious that electric heating units might equally as well be employed. The air driven by the fan passes upward through the heat exchanging means, being raised in temperature and thereby rendered more absorptive to moisture.

A spider framework 12, just above or at the bottom of a casing, carries a suitable bearing or journal 13 for the lower end of a rotatable shaft 14 extending upward at the vertical axis of the drier. Another similar spider framework 15 at the upper end of the cylindrical portion of the casing carries another top bearing 16 for the upper end of shaft 14. Attached to the shaft is a cylindrical drum 17 which serves both as a spacer and as a deflector. Mounted on the top and bottom of this drum are horizontally outstanding arms 18, 19 which carry vertical posts 20 at a spaced distance from the drum. Intermediate their ends these posts help support other horizontal arms 21 the inner ends of which are secured to the drum.

The bottom horizontal arms 19 extend outward from the drum beyond the vertical posts 20 and their ends are joined by a ring support 22, which is closely adjacent to the inner surface of the cylindrical casing 1. On this ring support 22 and a corresponding support 23 attached to the vertical posts 20, are placed a series of removable tray sections 24 each of circular or annular configuration with radial edges 24a abutting one another. Attached to the outer ring support 22 is an upstanding annular plate 25 having its top edge turned inward so as to incline upwardly. In the direction of its inclination there is provided another ring support on the vertical posts 20.

Removably resting on these ring supports 25 and 26 is the lower drying shelf 27. This is also in sections, each section comprising a series of radially spaced bars 28 to which are attached circularly disposed bars 29 whose upper edges are serrated to provide upstanding teeth 29a. The drying shelf 27 is above the tray sections 24 so that any adhesive dripping from the shelf will fall into the trays.

Directly above the lower shelf 27 is another drying shelf 30 the elements thereof and supports therefor being substantially duplicates of those already described for the lower shelf. Corresponding elements are numbered on the drawings with the same reference numerals with a prime added to each. Under this upper shelf is another series of removable drip trays 31, but instead of resting horizontally like the lower trays 24, the upper trays 31 are inclined upward from their outer edge toward the vertical posts 20. The purpose of this inclination is to utilize the under surface of these trays as a deflector for the air currents.

Air driven upward by the fan through the heat exchange means turns outward to continue upward around the drum 17 the bottom of which serves somewhat as a deflector in this respect. The air passes upward through the opening 32 between the drum and the lower drip trays 24 as indicated by the arrows in Figure 2. Above this opening is an inclined deflecting plate 33 having its outer edge attached to the posts 20 inside the ring support 26. Its lower inner edge 33a is spaced from the drum so that while part of the air is deflected outward and upward, to pass through the lower shelf 27, the remainder of the air can pass directly upward near the drum. This air again mixes with the portion flowing through the lower shelf as this latter portion encounters the upper inclined drip trays 31 and is thereby deflected back toward the drum. The commingled air is then deflected outward by another inclined deflector plate 34 which is secured at its inner and lower edge to the drum and inclines upward and outward to be secured to the posts 20 inside the ring support 26'. The air thus deflected outward passes between the upper edge of the drip trays 31 and the deflecting plate 34 and passes thence through the upper shelf 30 and on into the conical top 35 of the casing. This has a short neck 36 for its outlet and, if desired, a movable sleeve 37 of a fixed overhead duct 38 may be slipped down around the neck. The moist air can then be forced along by a fan 39 and through a suitable duct system 40 to outside of the factory.

At one side of the casing are upper and lower openings 41, 42 giving access to the shelves. Upon the operator's dipping a shoe S in a pan of liquid cement and then removing it, with the cement on its bottom, around the lower edge of the upper to a height indicated by the dotted line $a$ in Figure 2, and over the toe $b$, the shoe is placed on one of the shelves as indicated in Figure 2. The provision of the points not only avoids any sticking of the shoe to the conveyor when the adhesive is sufficiently dried, but prevents the shoe from slipping even though it is in a slanted or tilted position. Being so held, the excess cement rapidly drains off, running more or less toward the toe end and leaving a substantially uniform thick layer on the shoe. By placing the toe downward, any excess on the top side of the toe drains away over a cemented area and thus avoids any flow of the cement on the upper beyond where the toe cap will eventually be placed. The drippings of the surplus cement fall into the trays below and should any of this dripping run down the outside of the annular supporting plates 25, 25', it will be caught in troughs 43, 43' provided at their bottom edges.

As each successive shoe is placed in the drier the drum and shelves are rotated. In the embodiment shown this rotation is effected by the operator but it is obvious that power means could readily be applied for causing the aforesaid rotation. In due course, as the rotation continues the shelves will be filled with shoes and finally when the shoe first inserted in the drier is returned to the openings 41, 42 the operator thereafter removes a dried shoe as a freshly dipped one is put on the rotor.

The drying proceeds rapidly, due to the constant flow of heated air past the shoes and because the entire surfaces of the adhesive is available to this air, the points of contact between the teeth and the shoe bottom being negligible. Not only does the drying proceed rapidly but it does so with marked uniformity and when each shoe is taken from the drier the adhesive is in proper "tacky" condition to receive the elements to be applied thereto.

After continual operation of the drier the drippings of the adhesive which adhere to the shelves and to the trays should be removed. If it is not feasible to stop the production while this cleaning is done, a fresh clean drier can be rolled up beside the one in use, and thereupon as the operator takes a dried shoe from the drier which needs cleaning, a freshly dipped shoe is placed in the new drier. Thus in due course the new drier will become "charged" with the shoes and the old drier emptied. The latter can then be pushed to one side and cleaned when convenient. A removable door 44 on the side of the casing, in addition to the opening 41, 42 enables the shelves and tray sections to be easily and quickly removed from the drier.

Although but two shelves are disclosed in the drier illustrated, it is possible to increase the number, provided the air supply is made adequate to carry on the drying to the proper degree in the same time for all of the shoes on the several shelves.

As previously noted, the improved method and means embodying and employing the principles of this invention, make it possible to effect the drying of an adhesive in much less time than has heretofore been required, even when the brushing method has been used, and with much more uniformity in the product.

We claim:

1. Means for drying footwear comprising in combination, a cylindrical casing having top and bottom openings; means for moving air upward through the casing; a rotor in said casing having a closed cylindrical portion at the axis thereof and having near the periphery thereof at one level an openwork shelf for footwear to be dried and having at an upper level another openwork shelf for footwear to be dried; deflecting means on said rotor for causing a portion of the moving air to be directed through the first mentioned shelf and the remainder of said air to be passed by said first mentioned shelf and directed through the shelf at the upper level.

2. Means for drying footwear comprising in combination, a cylindrical casing having top and bottom openings; means for moving air upward through the casing; a rotor in said casing having at one level an openwork shelf for footwear to be dried and having at an upper level another openwork shelf for footwear to be dried; deflecting means in said casing for causing a portion of the moving air to be directed through the first mentioned shelf and the remainder of said air to be passed by said first mentioned shelf, the said portion and remainder of said air then reuniting; and other deflecting means for causing said reunited air to pass through the shelf at the upper level.

3. Means for drying footwear comprising in combination, a cylindrical casing having top and bottom openings; means for moving air upward through the casing; a rotor in said casing having near the vertical wall of the casing an openwork shelf for footwear to be dried and having another such shelf above the first mentioned shelf; a deflecting member arranged above said bottom opening for dividing the moving air to cause a portion of it to flow outwardly and upwardly through said first mentioned shelf and the remainder to pass upwardly past said shelf; a second deflecting member above the first mentioned shelf to deflect the air passing therethrough in direction to reunite with the said remainder of the air; and a third deflecting member for directing the reunited air outwardly and upwardly to pass through the second mentioned shelf.

CHARLES H. CHACE.
ALFRED B. LINGLEY.
JAMES P. MARSHALL.